United States Patent
Yehliu

(10) Patent No.: US 11,671,857 B2
(45) Date of Patent: Jun. 6, 2023

(54) ROADSIDE COMMUNICATION SYSTEM FOR MONITORING AND MAINTAINING SENSOR DATA TRANSMISSION

(71) Applicant: MITSUBISHI ELECTRIC CORPORATION, Tokyo (JP)

(72) Inventor: Kuen Yehliu, Ann Arbor, MI (US)

(73) Assignee: Mitsubishi Electric Corporation, Tokyo (JP)

( * ) Notice: Subject to any disclaimer, the term of this patent is extended or adjusted under 35 U.S.C. 154(b) by 280 days.

(21) Appl. No.: 17/110,972

(22) Filed: Dec. 3, 2020

(65) Prior Publication Data

US 2022/0182855 A1  Jun. 9, 2022

(51) Int. Cl.
H04W 24/08 (2009.01)
H04W 84/18 (2009.01)
G08G 1/09 (2006.01)
G05D 1/02 (2020.01)

(52) U.S. Cl.
CPC .......... H04W 24/08 (2013.01); G05D 1/021 (2013.01); G05D 2201/0213 (2013.01); G08G 1/09 (2013.01); H04W 84/18 (2013.01)

(58) Field of Classification Search
CPC .................................................. H04W 24/08
See application file for complete search history.

(56) References Cited

U.S. PATENT DOCUMENTS

| | | |
|---|---|---|
| 2018/0033223 A1 | 2/2018 | Gortsas |
| 2018/0249084 A1* | 8/2018 | Lee ................ G04R 20/00 |
| 2019/0222652 A1 | 7/2019 | Graefe et al. |
| 2019/0244521 A1 | 8/2019 | Ran et al. |
| 2020/0028736 A1 | 1/2020 | Park |
| 2020/0072962 A1 | 3/2020 | Fang et al. |
| 2022/0126878 A1* | 4/2022 | Moustafa ........... B60W 50/14 |

FOREIGN PATENT DOCUMENTS

CN  111107572 A  5/2020

OTHER PUBLICATIONS

Seung-Ki Ryu, "Method of Fault Data Analysis of Sensor Node based on Wireless Data Communication Protocols", Journal of Emerging Trends in Computing and Information Sciences, Jan. 2015, pp. 54-59, vol. 6, No. 1.
Noura Aljeri et al., "An Efficient Fault Detection and Diagnosis Protocol for Vehicular Networks", DIVANet 13, Nov. 3-8, 2013, pp. 23-29.

* cited by examiner

Primary Examiner — Abdeltif Ajid
(74) Attorney, Agent, or Firm — Sughrue Mion, PLLC; Richard C. Turner

(57) ABSTRACT

Provided is a processing system to effectuate sensor processing of obstacle information for use in autonomous driving. The apparatus includes a communication module that receives sensor data collected by multiple sensors disposed to capture sensor data in a specified region to detect the obstacles. Additionally, a health status detection modules, in the system, determine the health status of the system and the sensors based on information from the sensors and a communication latency between the communication module and the sensors. The system also includes a sensor processing module to process the sensor data to identify anomalies in the data due to harsh conditions to eliminate any erroneous data.

17 Claims, 14 Drawing Sheets

System Configuration

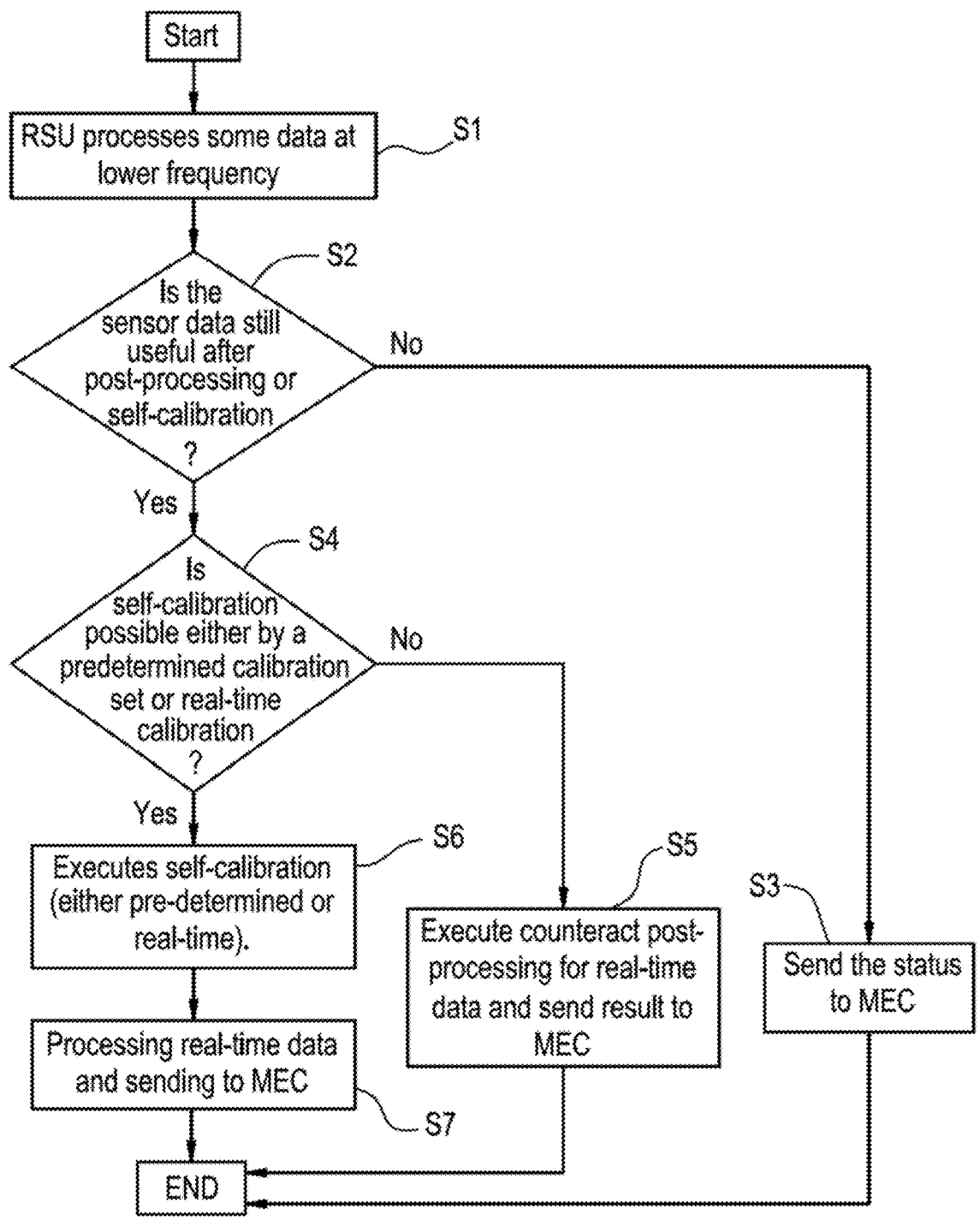

ROADSIDE COMMUNICATION SYSTEM FOR MONITORING AND MAINTAINING SENSOR DATA TRANSMISSION

BACKGROUND

1. Field

The disclosure relates to a system and method for monitoring and diagnosing the equipment in a roadside data collection and communication system.

2. Background

To perform autonomous or automated driving, most vehicles mount multiple ADAS sensors including a front camera, millimeter-wave radar sensors (MMWR), light detection and ranging sensors (LiDAR) and sonar, etc. However, even with these mounted sensors, blind spots still occur due to the field of view limitations (FoV) of these sensors. Thus, sensor data from roadside units (RSUs) are relied on to control the vehicle.

This disclosure relates to a traffic infrastructure communication system which consists of sensors, roadside units (RSUs), vehicle controllers, multi-access edge computing (MECs) units, and a control center, communicably connected via either a cloud computing service, a wired connection, a wireless local network or cellular communication network, or the combination of each.

When the communication among sensors, RSUs, MECs, and control center are put together in a system for controlling a vehicle through the vehicle controller but the function is not working as expected, it takes time to diagnose the cause of the problem. Meanwhile, it requires that the system stop functioning during the investigation.

In order to address these needs, a measure is proposed to work with the communication system described above that is capable of monitoring and diagnosing the function of each component listed above.

SUMMARY

1. Technical Problem

In the traffic infrastructure communication system described above, there has been occasion when one or multiple communication devices are not working properly, or one or multiple of the communication paths ceases to be functional. One possible method to manage the problematic devices is to shut down the system and replace the malfunctioning devices. However, this takes time and results in system downtime during investigation and maintenance.

2. Solution

In accord with various aspects of the present disclosure, system redundancy and reliability is maintained by implementing various system and device structures to evaluate sensor and other system diagnostics to recognize failures in early stages. Additionally, aspects of the disclosure relate to diagnosing various problems and to maintain as much system functionality as possible by processing information to discard erroneous data. An example design is to make use of the multi-core hardware architecture and dual-core lock-step software on the main and checker cores. The dual-core are initialized in the same way and process the same inputs. The output from the main and checker cores should always be observed. By comparing the outputs of the dual core, it is possible to determine whether there is any trouble in the MEC processor. If one main core is not functional, the software will be executed on another main core.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which:

FIG. 9 is a flowchart illustrating a method of sensor self-calibration and post-processing.

DETAILED DESCRIPTION

The following detailed description of example embodiments refers to the accompanying drawings. The same reference numbers in different drawings may identify the same or similar elements.

Figure 1:
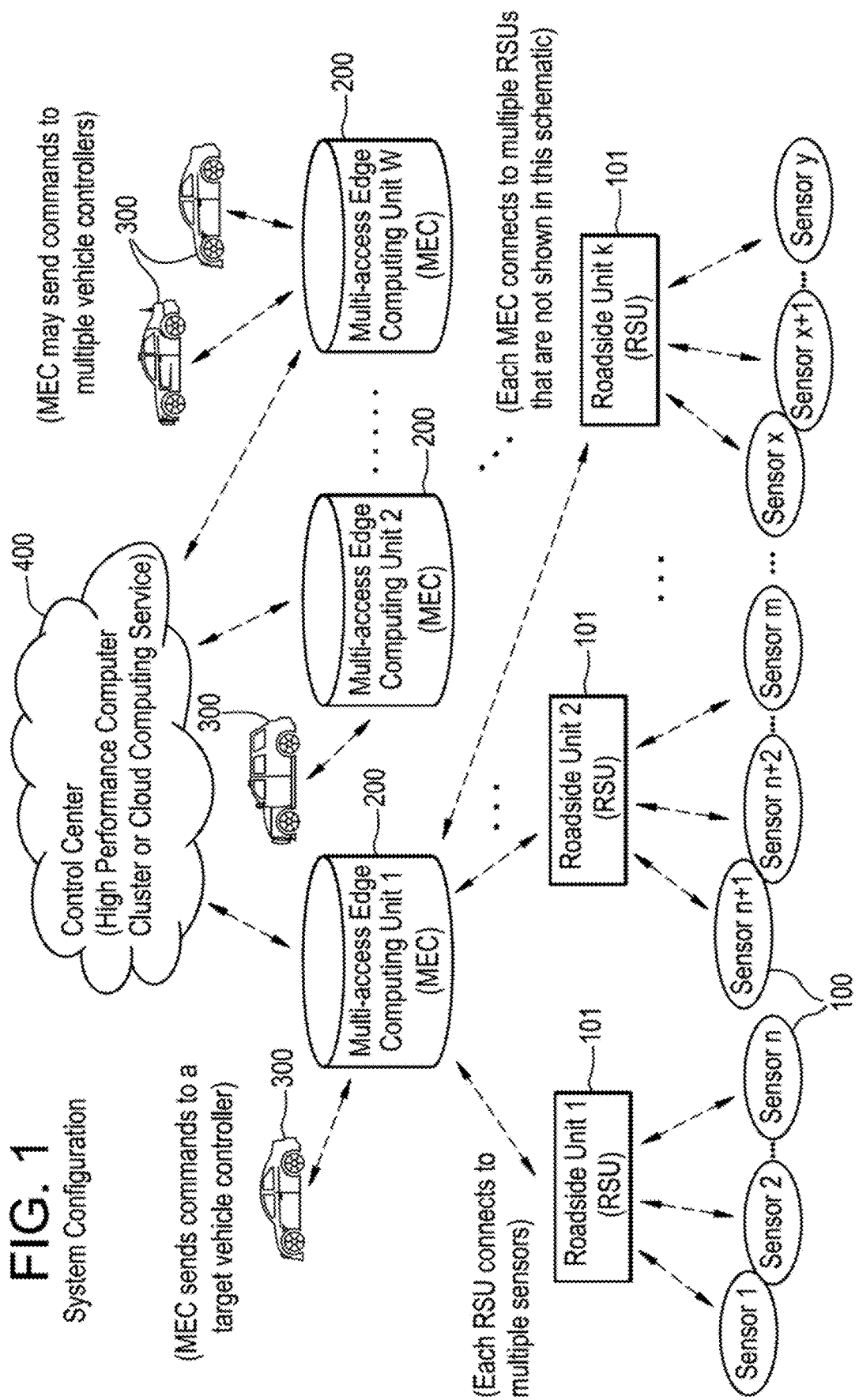
FIG. 1 is a diagram illustrating a roadside communication system configuration including sensors, RSUs, MECs, vehicles, and a control center.

FIG. 1 shows a system comprising of a data collecting infrastructure comprising multiple roadside units $101_1 \ldots 101_x$ (RSU1 ... RSU$_x$), multi-access edge computers (MEC) 200, a control center 400 and at least one vehicle configured with an advanced driving assistance system (ADAS) and an automated driving system (AD). The system relies on bi-directional communications between the sensors and the RSUs, the RSUs and the MECs and the MECs and the control system as illustrated. The system may comprise multiple MECs, RSUs and vehicles as shown in FIG. 1. Communication (bi-directional) between the RSUs 101 and each MEC 200 typically occurs through a wireless network like LTE or 5G, a wired local network or some other dedicated network. In this system, the infrastructure consists of multiple RSUs 101 each having multiple sensors 100. The MEC 200 can be implemented via a cloud computing environment, which may provide computation, software, data access, storage, etc.

Figure 2A:
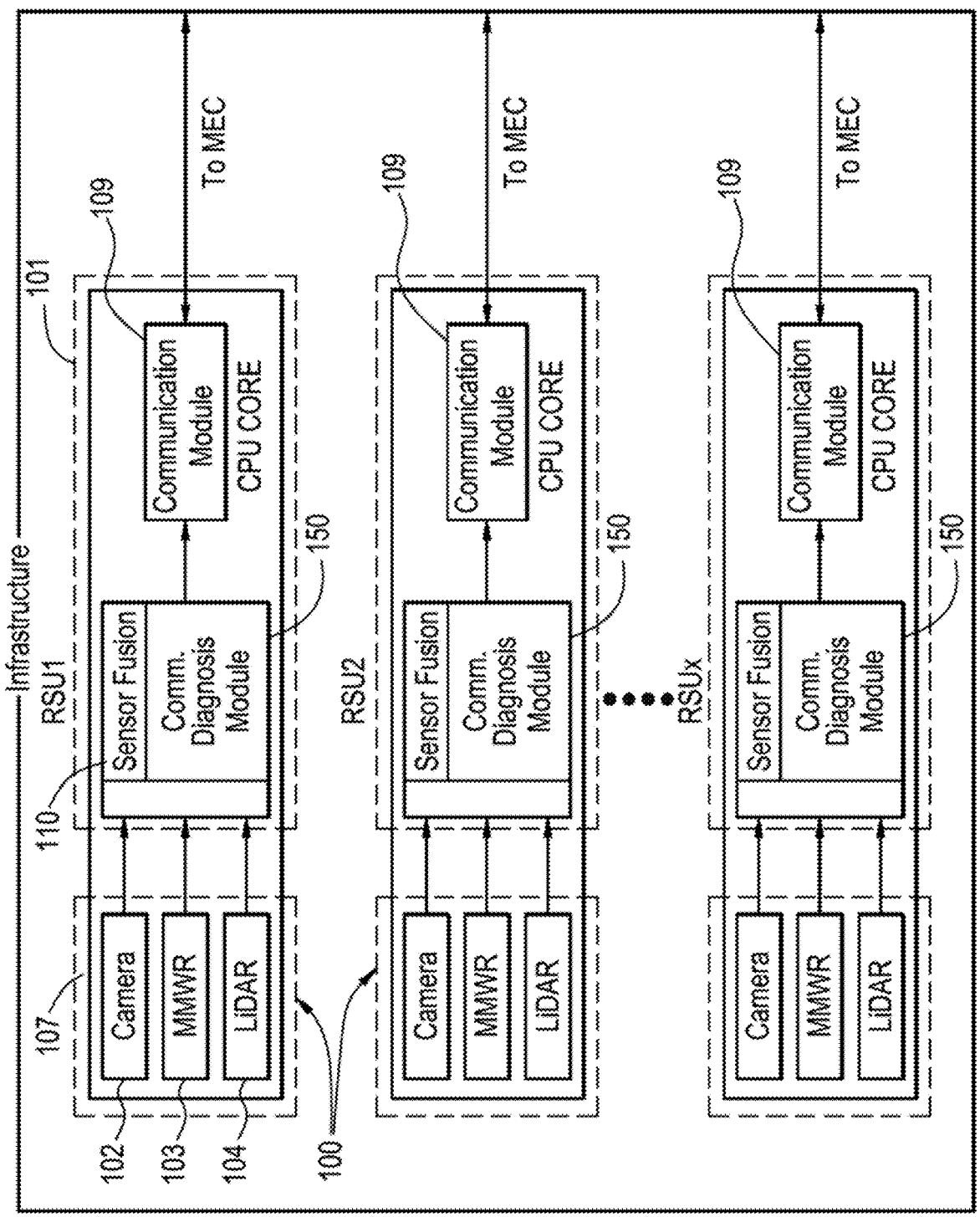
FIG. 2A is a diagram illustrating the sensors and RSUs of FIG. 1.
Figure 2B:
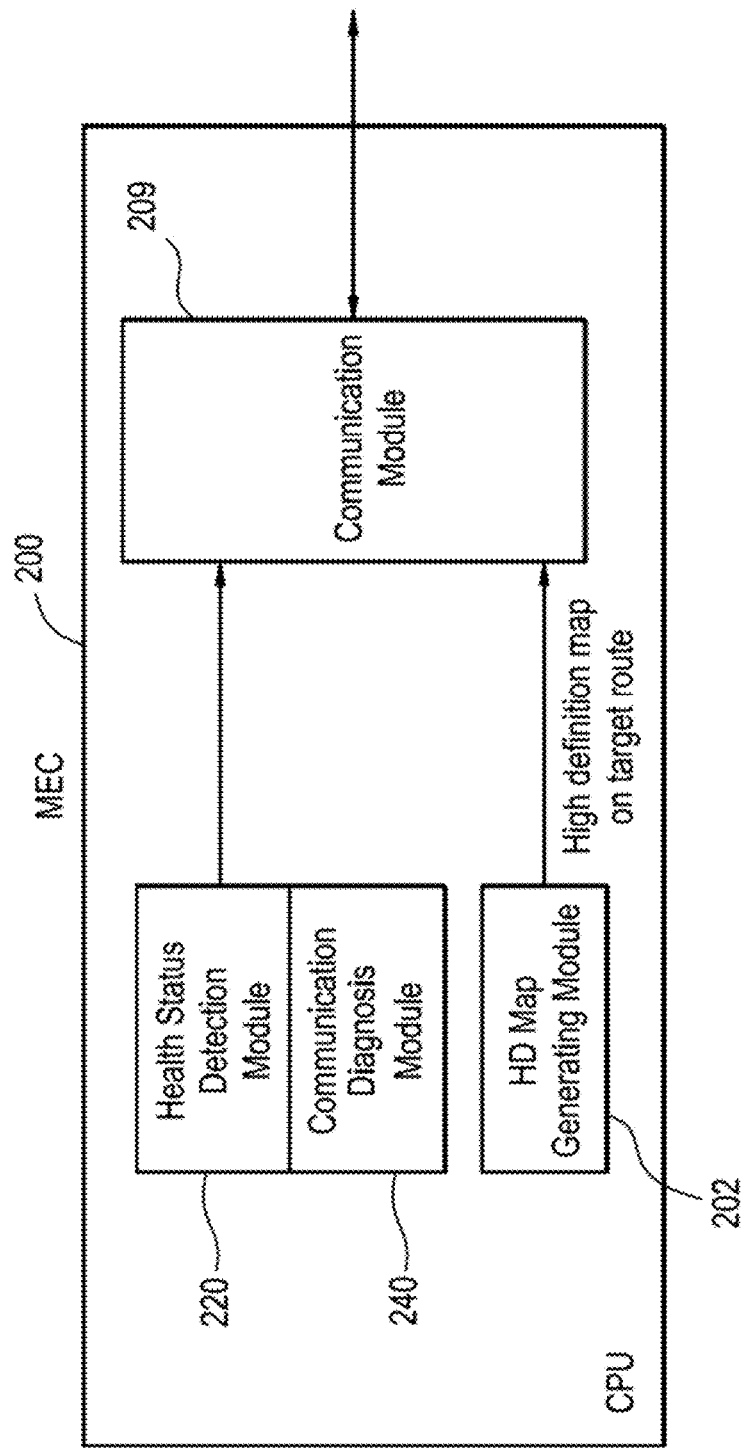
FIG. 2B is a diagram illustrating an MEC configuration.
Figure 2C:
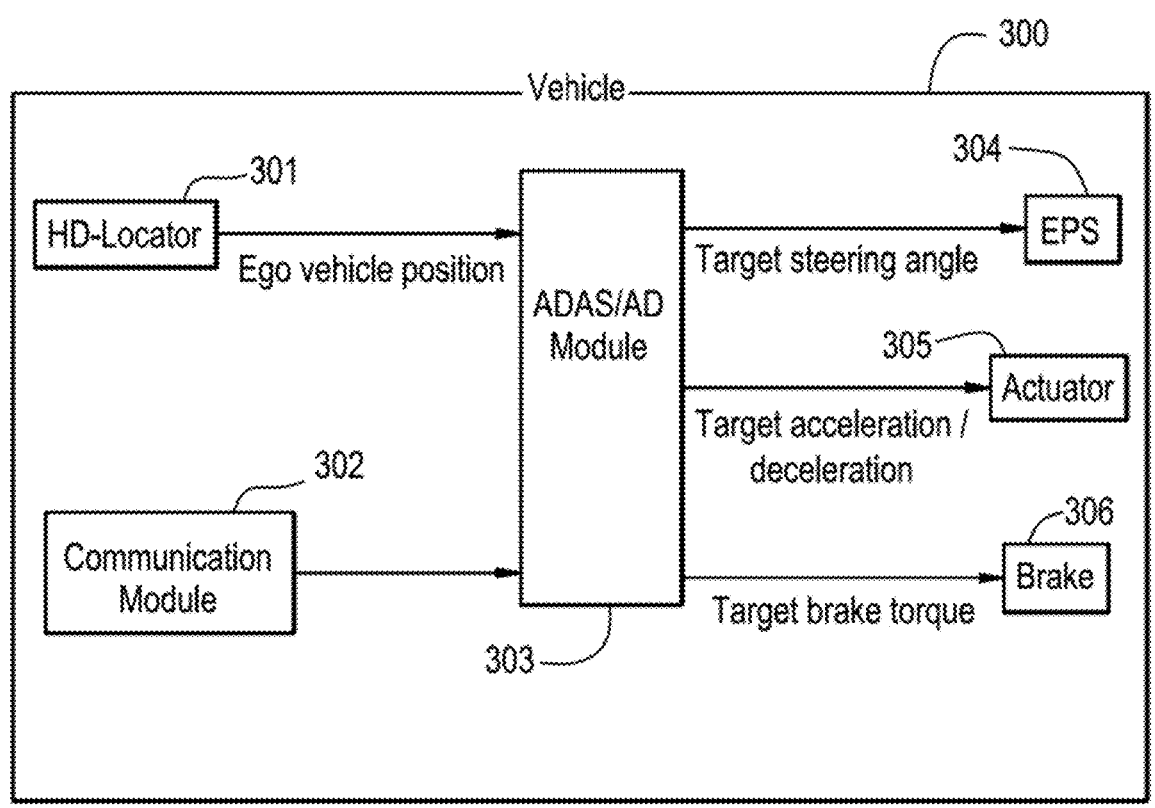
FIG. 2C is a diagram illustrating a vehicle processing system.

FIGS. 2A-2C show each component of the system shown in FIG. 1. FIG. 2A is a diagram of the data collecting infrastructure comprising multiple roadside units 101 (RSU). Each RSU 101 receives information from multiple sensors 100 for detecting object and vehicle information within their detecting ranges. The RSU 101 also includes a central processing unit (CPU) and a memory for storing software and sensor data. Each RSU 101 also includes a communication module 109 that communications with each sensor and the MEC 200.

The sensors 100 for each RSU may include, a millimeter-wave radar (MMWR) sensor 102, an image sensor 103, and light detection and ranging (LiDAR) sensors 104. The RSU can receive information from other sensor types as needed to provide traffic, weather and object detection capabilities. The RSU's may also include GPS capability to determine their locations, or alternatively, the RSU's may have their locations predetermined and stored. The sensor includes a communication module 109 to facilitate wired or wireless communications with a corresponding RSU.

As shown in FIG. 2A, each RSU 101 may include a sensor fusion module 110 to fuse information from different sensors to process the output of each of the sensors, collectively, to determine the presence of objects or obstacles as well as their respective locations. However, depending upon the capabilities of a corresponding RSU, the MEC 200 also has sensor fusion capabilities so that the sensor fusion function processes the data from multiple sensors in a sensor processing module 280 in the MEC 200 as shown in FIGS. 3E and 3F. The sensor processing module 280 processes the data from multiple sensors to obtain obstacle information including the location of the obstacle (latitude, longitude), the velocity of obstacle, and object/obstacle classifications such as whether the object is a vehicle, a pedestrian, a cyclist, or the like.

As illustrated in FIGS. 1 and 2B, the MEC 200 receives the sensor data from multiple RSUs 101$_x$ based on the sensor determinations. The MEC 200 includes a central processing unit and a memory to store data and processes instructions. In addition to receiving and storing the sensor data from the RSUs 101, the MEC 200 may store a high definition map of a target route in advance. The MEC 200 processes this sensor data to obtain obstacle information.

The MEC 200 includes a communication module 209 configured to communicate with the RSUs 101. The communication module 209 receives the sensor data and store the sensor data for further processing. This may be raw sensor data, or it may include obstacles and their respective locations and timing. If the RSU 101 has sensor fusion capabilities, this information may also be sent to the MEC 200 to indicate the data is fused data. The MEC 200 may also receive information regarding the sensor status, and RSU status from the RSUs 101.

The MEC 200 includes a health status detector module 220 and a communications diagnosis module 240 that function to determine the reliability of various data collection systems, i.e., sensor, RSUs, etc.

1. System Robustness and Fail Safe Function

The MEC 200 includes a communication diagnosis module 240 and a health status detection module 220 that receive a self-diagnosis result from each of the connected RSUs 101, including information regarding the health status of the sensors 100, the health status of the RSUs 101, and the communication status between the sensors 100 and RSUs 101. Depending on the result, the MEC 200 manages deactivation, or a partial deactivation of the RSU 101 and sensor 100 functions. The self-diagnosis can be performed using any of the following configurations described below. The RSUs 101 and the vehicle 300 also include similar modules to determine their respective heath and communications status as described below.

When a device in the system is not functioning properly based on the determinations described herein, sensor and or RSUs may be deactivated, or in certain cases calibration events may improve functionality. In other cases, some data may be parsed to ignore unreliable data portions, while relying on reliable data to make evaluations regarding obstacles, etc. The goal is to maintain as much system functionality as possible despite some device failures.

A. Health Status Determinations

Figure 3A:
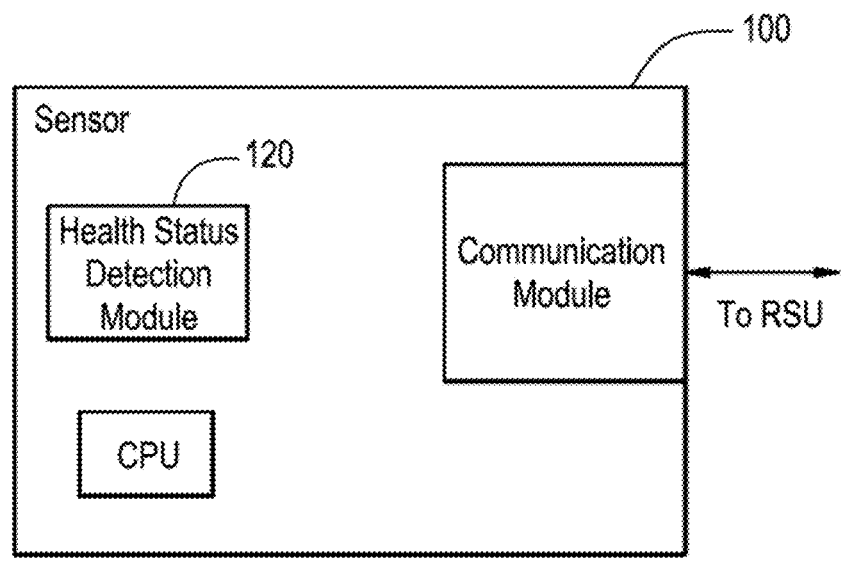
FIGS. 3A-3H are a diagrams illustrating health status detecting configurations for the devices of FIG. 1.
Figure 3B:
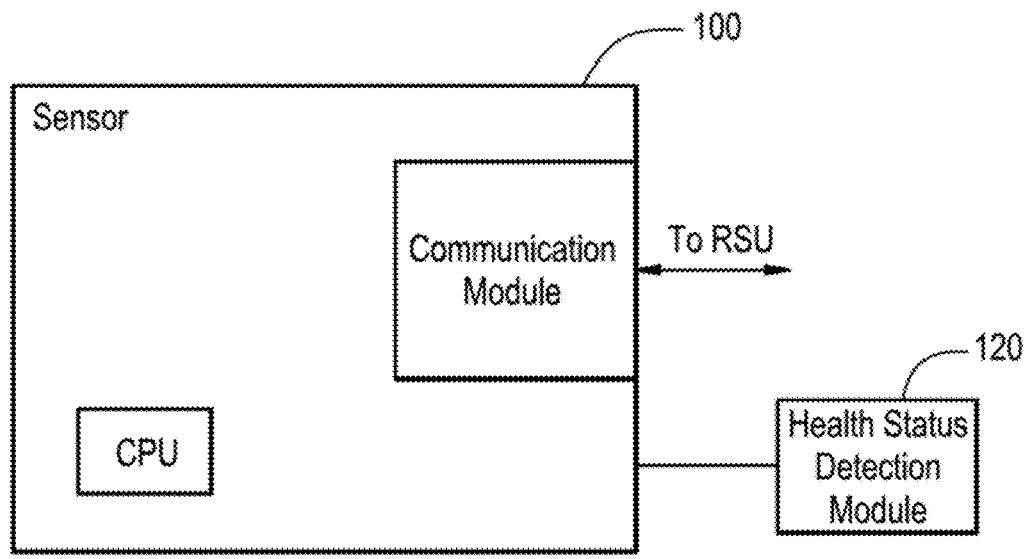
Figure 3C:
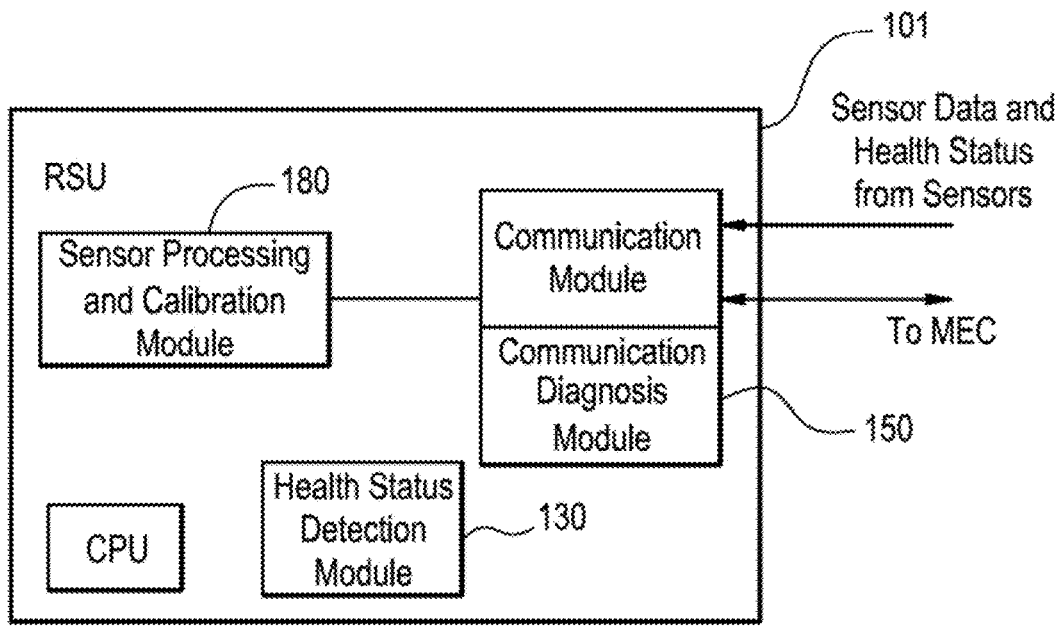
Figure 3D:
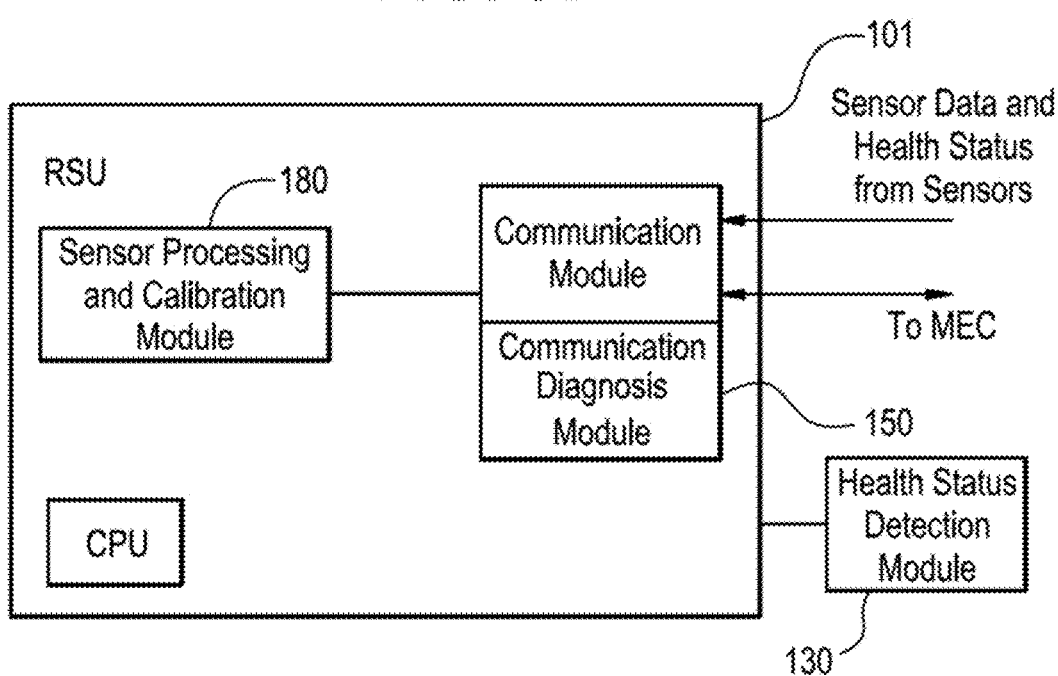
Figure 3E:
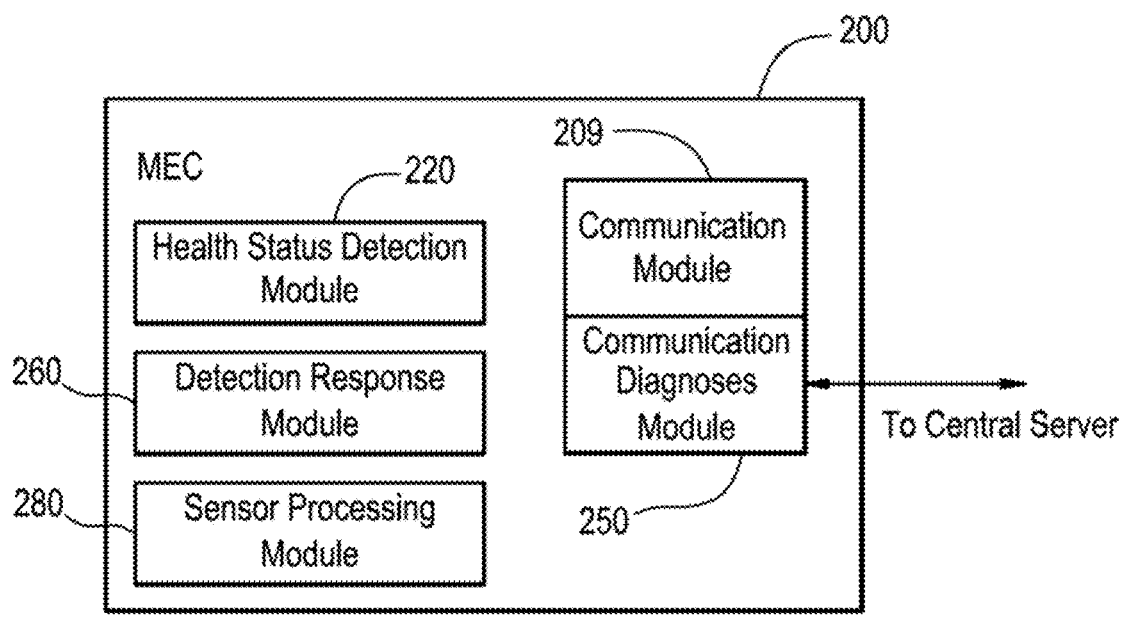
Figure 3F:
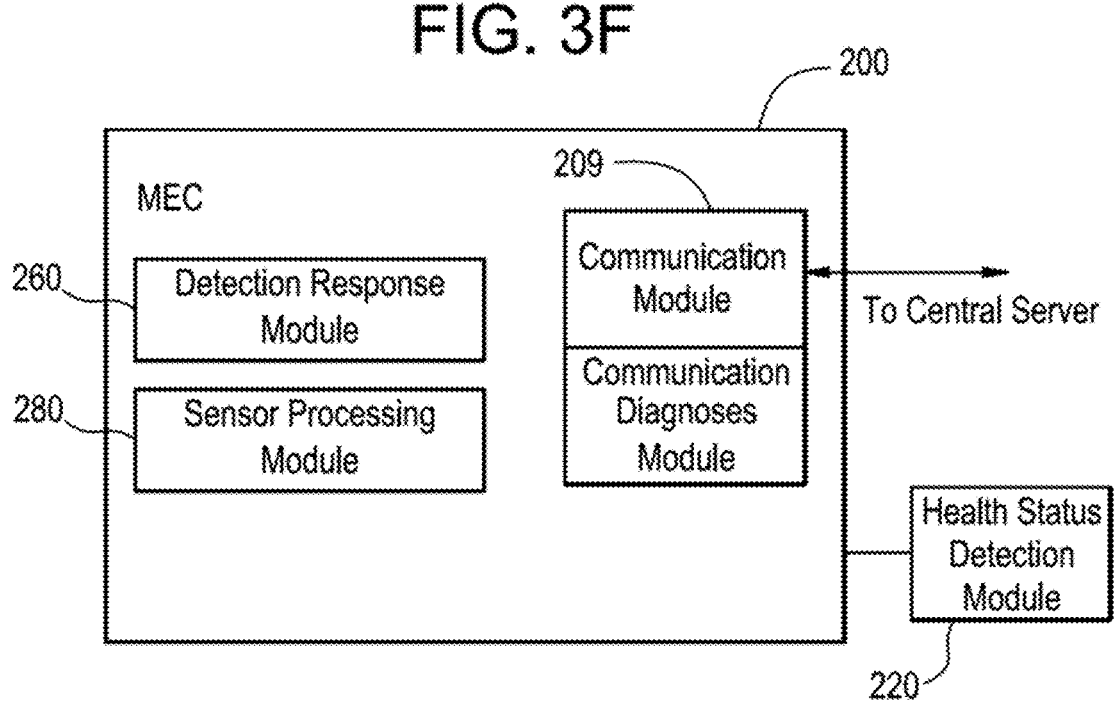
Figure 3G:
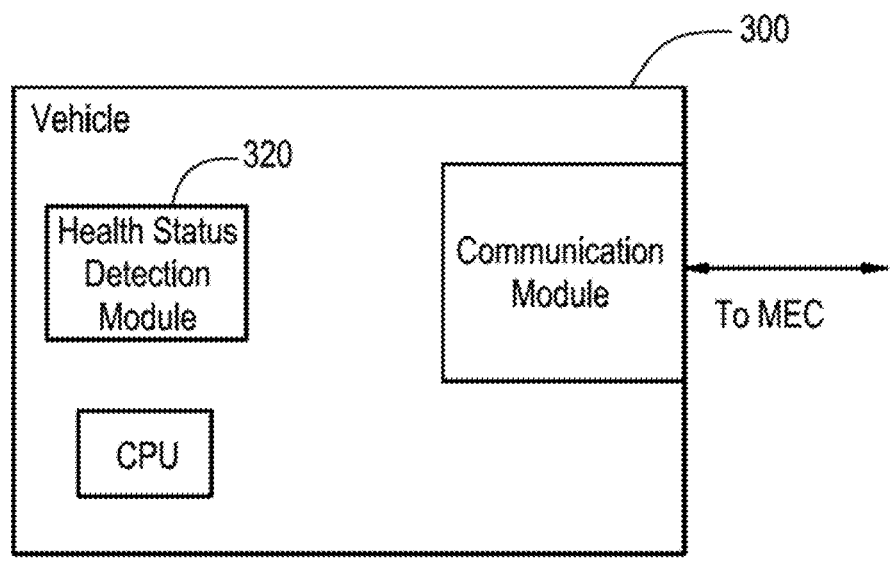
Figure 3H:
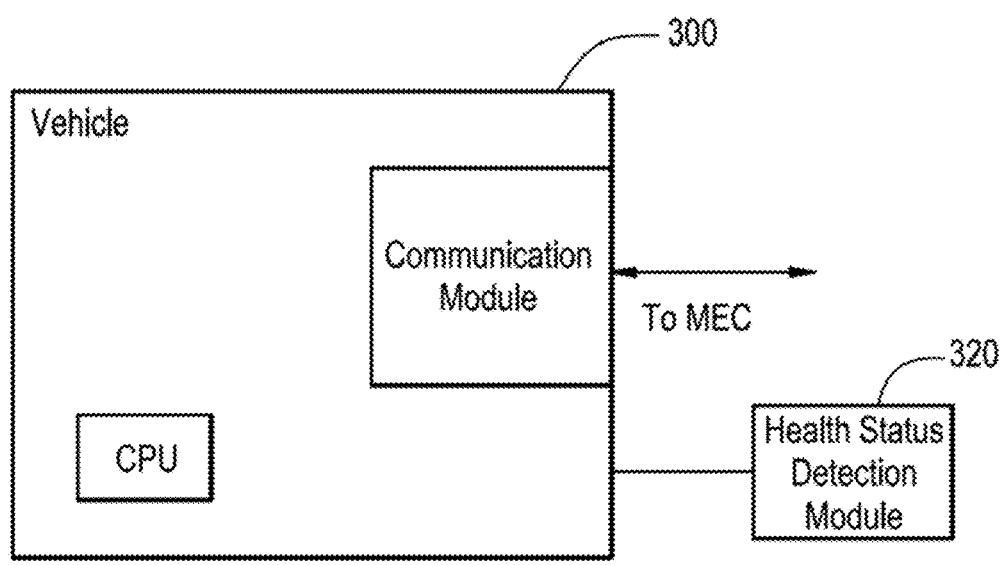

As illustrated in FIGS. 3A and 3B, the sensors 100 can include a health status detection module 120 implemented by either hardware or software to determine a health status of the corresponding sensor 100. The health status detection module 120 can be configured as an internal health status detector module, or an external module designed for detecting the health status of the sensor 100. Each sensor communicates the detected health status to the RSU 101, which in turn transmits the results to the MEC 200. Similarly, as illustrated in FIGS. 3C-3H, each of the RSUs 101, the MEC 200 and the vehicles 300 may be configured with a health status detection module 130, 220, 320 to diagnose the health status of each corresponding device.

The health status of the devices is determined based on the internal structure of each corresponding device. For the sensing unit of the sensor, the health status may also include the hardware-level electronic circuit health status by monitoring the voltage and current in real-time. In addition, it is also possible to monitor the temperature and humidity surrounding the hardware to indirectly ensure that the hardware is in an acceptable operating environment. The RSUs 101, on the other hand, typically include some processing capabilities and their health status can be determined by communication status checks, as well as relying on the multi-core processing as described below. Similarly, the MECs 200 may also rely on multi-core processing, The health status also includes the health of the processor and processing of the sensor 100 or the RSU 101. For example, one device may send/receive a heartbeat periodically so other devices can, at least, check to determine if the device is functional at a minimum level. A checksum operation may also be applied to ensure that the software and data stored in a microprocessor is not damaged. Additional health status determinations are described below.

B. Communication Status Determinations

The communication status between the sensors 100 and a corresponding RSU 101, as well as each RSU 101 and a corresponding MEC 200, can be monitored to determine the current communication status of the devices as a determination of the health status of communications. Communications between each vehicle 300 and a corresponding MEC 200 are also evaluated in the same manner. Each of the RSUs 100, MECs and vehicles 300 may include a communications diagnosis module as a part of the communication modules to evaluate the effectiveness of the current communication state. The communication status is then stored and may be reported with health status information, or as part of the health status information.

Figure 4A:
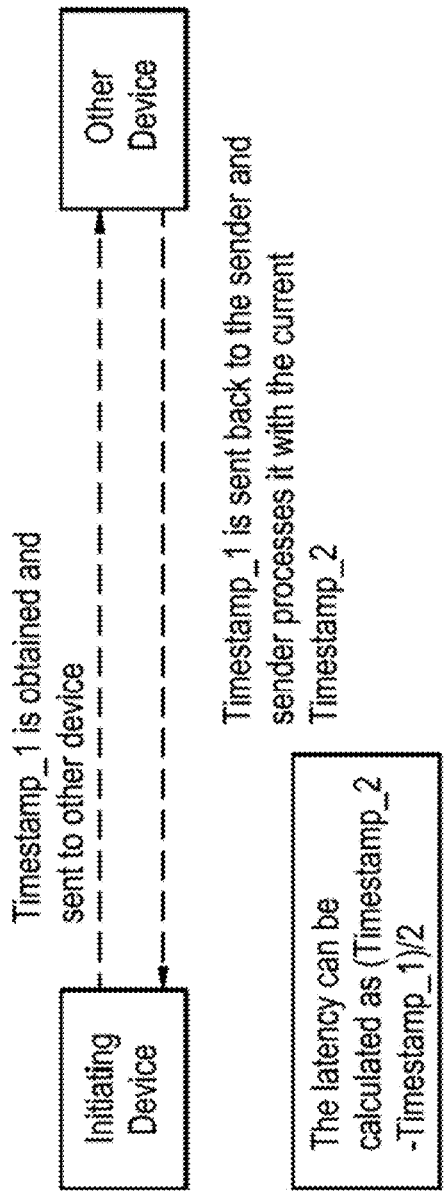
FIGS. 4A-4B are diagrams illustrating a method of testing communication between devices.
Figure 4B:
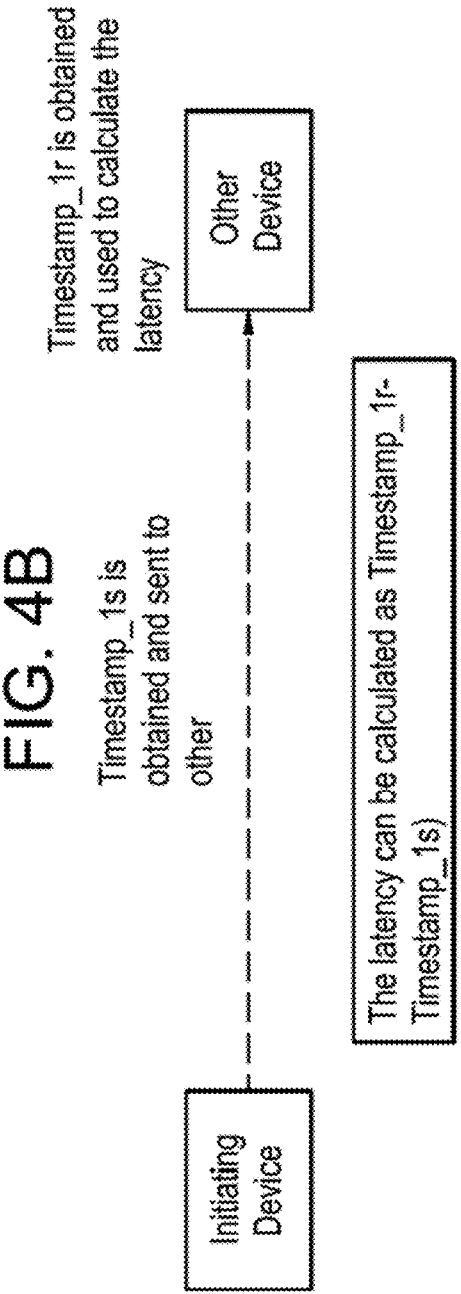

The status may be determined using dedicated transmissions between corresponding devices. One method measures the status by evaluating the time latency of communications between devices to ensure data communications are timely received. With reference to FIGS. 4A and 4B, communications may be monitored using timestamps with dedicated communications to determine a current communications status.

Dedicated signals, which are from neither the real sensor signals nor the processing results of the real sensor signals, are transmitted among the devices including:
RSUs,
MEC(s),
Control Center,
Vehicle In accord with this embodiment, either device involved with a transmission event can make a determination of the communication status as a part of the overall health status. However, this description describes the RSU 101 evaluating the communication status between sensors 100 and the RSU 101. Similarly, the MEC 200 evaluates the communication status between the MECs 200 and the RSUs 101, or the MECs 200 and the vehicles 300 in the same manner. One possible implementation is to send a message with timestamp based on a clock generated at the sending device, and having receiving device retransmit the message back to the sending device. The transmission device can then calculate the round-trip elapsed time by calculating the difference between the current timestamp and the timestamp that was earlier generated and transmitted between the two devices.

The sensor/RSU communication status is determined using the RSUs communication diagnosis module 150. With reference to FIG. 4A, the communications diagnosis module 150 sends transmits a message with Timestamp_1 obtained just prior to transmission to a corresponding sensor 100. The sensor 100 re-transmits the message back to the RSU 100 with the Timestamp_1. The communication diagnosis module 150 obtains a Timestamp_2 after the message is received back from the sensor 100. After receiving this information, the communication diagnosis module 150 determines the round-trip transmission time as follows:

$$\text{Round-trip transmission time} = \text{Timestamp\_2} - \text{Timestamp\_1}$$

It may also be determined, if it is assumed that the latency for both the trips (sender to receiver, and receiver to sender) are the same, that the transmission latency is the round-trip transmission time divided by 2. The timestamps may be obtained from either an internal clock or from an external clocking source such as a GPS, or satellite clock. Further variation of the scheme can be developed. One example is to derive the latency by transmitting the timestamp repeatedly and calculating the average.

Another implementation is to derive the latency from the clock decoded from the satellite signals (GPS, or the like) if both the transmitter and receiver has the capability to receive the satellite signal. FIG. 4B illustrates this procedure.

In this case, the communication diagnosis module 150 of the RSU obtains a Timestamp_1s just prior to transmission of the diagnosis message. Timestamp_1r can be sent back to RSU (the initiating Device) with Timestamp_1s but this is redundant and unnecessary. After the sensor (other device) receives the message containing Timestamp_1s, the sensor processing unit (the CPU of the other device) obtains the timestamp, Timestamp_1r, from, for example, a GPS timer. Then, the latency can then be calculated by the sensor processing unit (the CPU of the other device). If the initiating device needs the information, the other device which has calculated the latency can provide the latency value to the initializing device.

When the latency for receiving GPS timestamps is the same for both the sender and the receiver, transmission time can be obtained through the following equation:

$$\text{Transmission time} = \text{Timestamp\_1}r - \text{Timestamp\_1}s$$

The same concept of monitoring the health status including the communication status can be extended to any additional devices in the system and are not limited by the devices that are described here. For example, if the system introduces a recording device that is connected with the RSUs, the health status and the communication status can be monitored in a similar manner.

C. Maintaining System Functionality

The processor of the MEC 200 monitors the properties and results of all health status detection modules and communication diagnosis modules in order to manage the system functionality to maintain operations. The results are analyzed in a detection response module 260 that may command that the failed sub-system will be deactivated, or be partially deactivated as described below. In some cases, some of the data from the failed system will be ignored and not used. The MEC sub-system itself shall include a design such that there is a backup hardware/software that is available for keeping the system running when a failure occurs in the MEC sub-system.

Dual Core Architecture with Checker Cores

Figure 5:
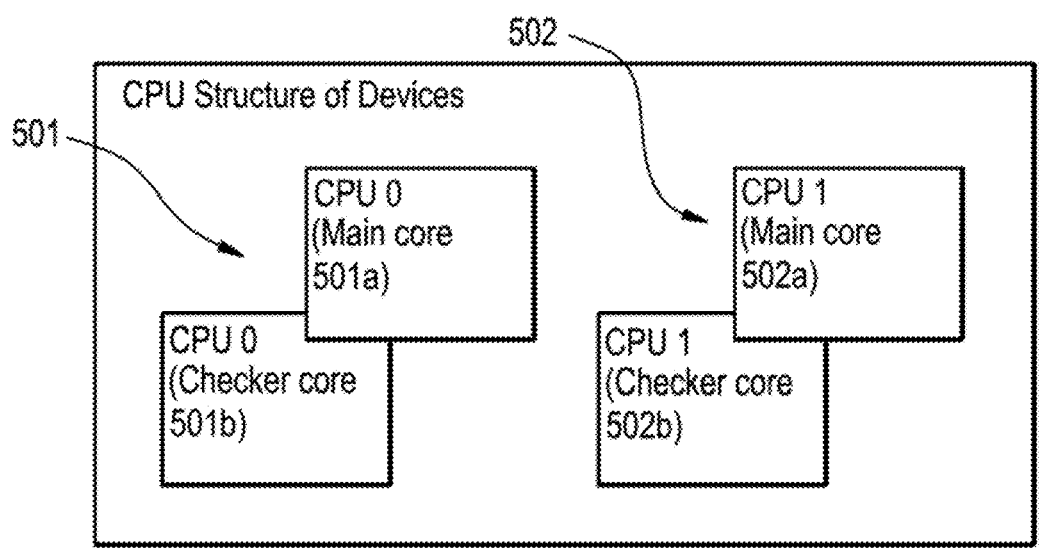
FIG. 5 is a diagram illustrating a processor configuration for the devices of FIG. 1.

One implementation is to make use of a multi-core hardware architecture and dual-core lock-step software on the main and checker cores. This structure enables the device to perform internal health status checks and to maintain redundancy to permit system function in the event of a processor's failure. Each of the sensors 100, the RSUs 101, the MEC 200 and the vehicle 300 may be configured with a central processing unit (CPU) having the structure shown in FIG. 5. This structure can be utilized to perform health status checks, as well as to provide system redundancy.

The use of lock-step (main and checker core architecture like the pair of 501a and 501b, and 502a and 502b) permits the implementation of two features. One feature is the detection of errors. The second feature is the correction of errors. The health status is related to the detection of errors. If the outputs of the same calculation process (or "step") from the main core and checker core are not the same, this shows that the system is not functioning properly and exhibits a poor health status. The ability to move the processing from one CPU to another CPU permits the system to maintain functionality until maintenance can be performed.

The central processors of the devices are configured with two cores, CPU0 501 and CPU1 502, which may be on the same chip. These dual-core processors 501a, 501b and 502a, 502b are configured to be initialized in the same way and to process the same inputs. The output from the main 501a and checker core 501b is consistently observed. By comparing the outputs of the dual core, it is possible to determine whether there is any trouble in within the currently used processors. Additionally, in the event it is determined that one main core 501a is not functional, the software and other processing will be executed on another main core 502a, which is configured to utilize checker core 502b to observe outputs for consistency.

Deactivation

In the event there is a health status or communication issue with a sensors or an RSU 101, the status is communicated to the MEC 200. Based on the type of issue, the detection response module 260 may send a command to the RSU 101 requesting the RSU 101 to deactivate the sensor. This ensures that the data processed and transmitted to the vehicle 300 from the sensors and RSUs 101 do not provide inaccurate data. Alternatively, upon certain issues such single sensor failure, the detection response module 260 control processing to ignore the data provided by failed sensors 100 while continuing to rely on data from functioning sensors 100. In the event of partial sensor failure, the MEC 200, may only rely on specific regions or valid portions of the sensor data.

Diagnosis of the Sensor System Malfunction Due to External Harsh Conditions

Figure 6A:
FIGS. 6A-6C are illustrations of sensor information under different external conditions.
Figure 6B:
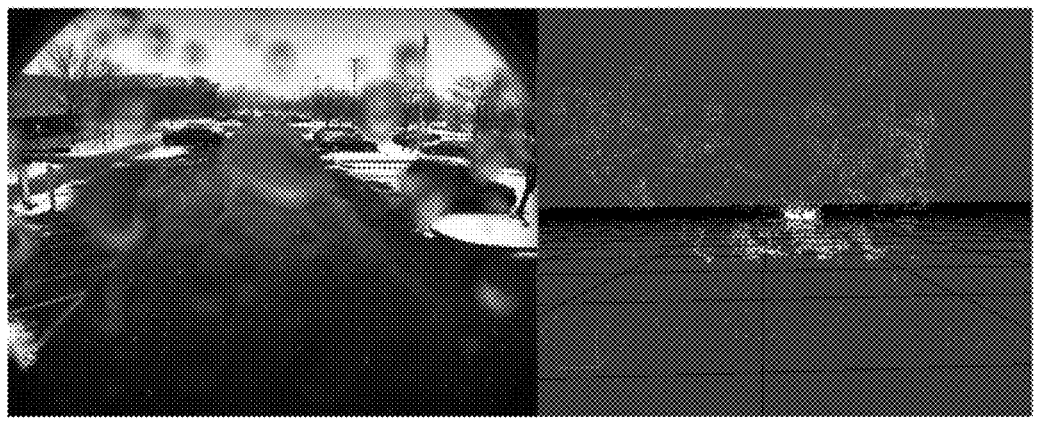
Figure 6C:
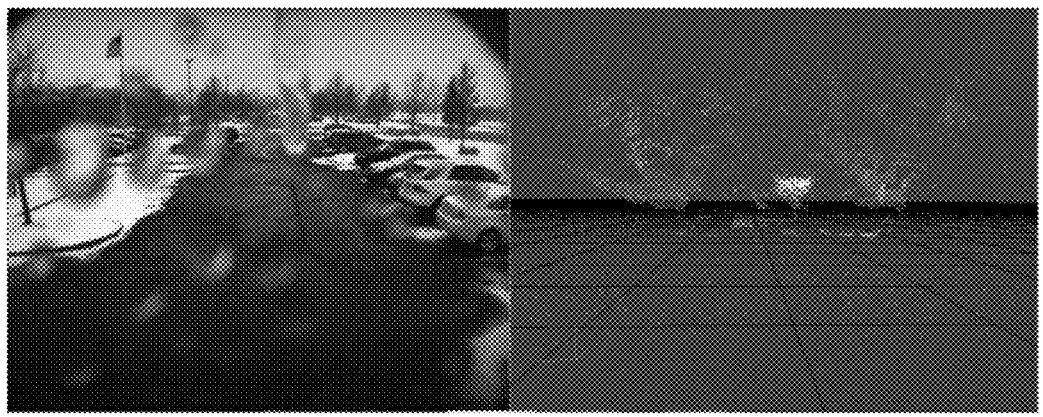

FIGS. 6A-6C and 7S-7B show some examples where sensors are impacted by harsh weather conditions. FIG. 6A shows some baseline data showing camera image data from an image sensor and LiDAR point clouds during normal or clear weather conditions. In contrast, FIGS. 6B and 6C show the impact of the camera image and the LiDAR point cloud when impacted by condensed water, ice and icicle formation on the sensor. FIG. 6B shows an image and Lidar point could when the sensors experience water condensation and some ice formation. FIG. 6C shows a similar image under the condition where icicles are formed on the sensors.

The health status detection module 130 and the calibration module in each RSU 101 are configured to determine which portions of the real sensor signals are reliable by diagnosing conditions where the normal sensor processing result may not be reliable. For example, due to the formation of the icicles and ice in front of the cameras and Lidar lenses, or sunshine glare, etc., the data from the RSU 101 may be difficult for the MEC 200 to process or it may provide inaccurate or unreliable information.

By comparison of FIGS. 6A (normal weather) and 6B-6C (water and ice), it is apparent that some portions of the image sensor are distorted and cannot provide useful information. Likewise, the LiDAR sensor receives less point cloud data in some regions, and a very dense point cloud in some regions with no associated object or obstacle. The diagnosis result can be used as described below.

In response, the RSU 101 may use the diagnosis result of the health status detection module and executes the processing of the sensor signals using the sensor processing and calibration module 180 to counteract the harsh conditions via self-calibration or post-processing such that the processing result is still useful for object detection. Additionally, further sensor data processing occurs in the sensor processing module 280 of the MEC, which can determine what portions of the sensor data are reliable by recognizing regions of the sensor data that are impacted by the harsh weather conditions.

Figure 7A:
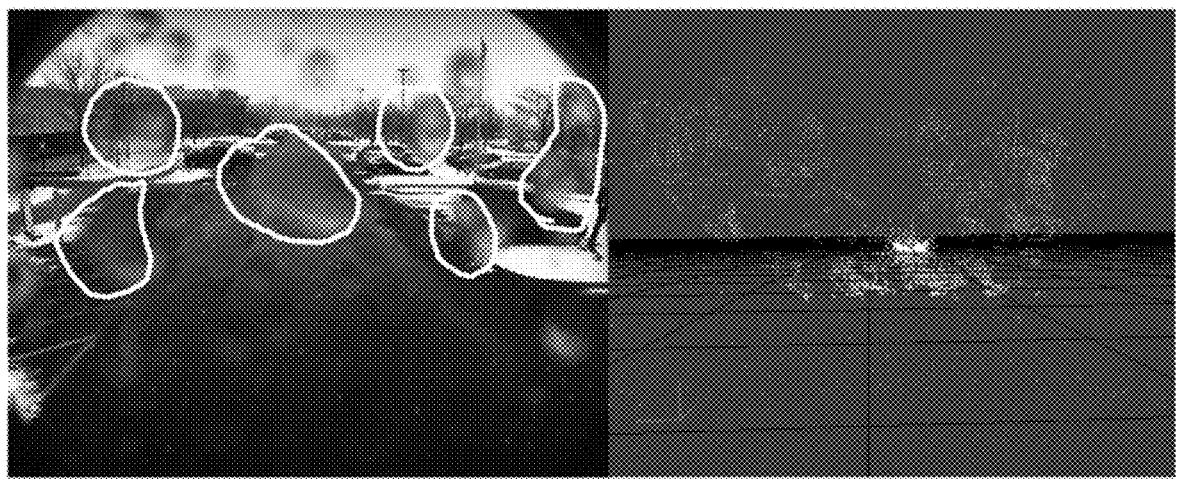
FIGS. 7A-7B are illustrations showing identified sensor regions providing unreliable data.
Figure 7B:
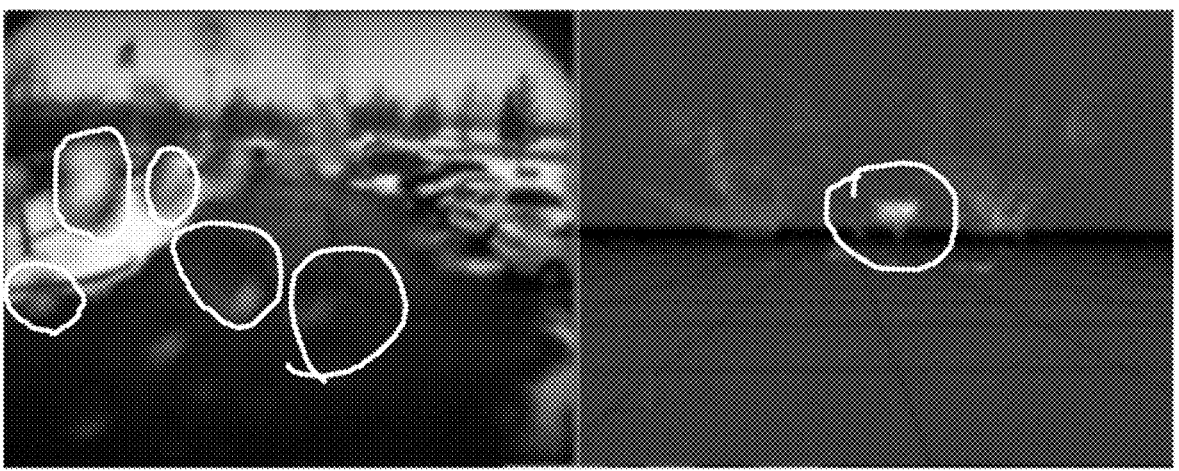

An example is to use artificial intelligence-based algorithm to determine a possible region in an image or point cloud frame as a region affected by ices or icicles, as illustrated in FIGS. 7A-7B. FIG. 7A shows identification of regions where water condensation and iced areas affect the sensor readings. FIG. 7B shows identification of regions affected by ice and icicles. The affected regions are identified (marked in figure) as regions providing unreliable data, and this portion of the sensor data is not used in the MEC 200 processing for obstacle or other critical judgements. Some critical judgements that should be avoided under those weather affected areas/regions in an image or Lidar point cloud frame include the detection of a standing/walking pedestrian or static/moving vehicle. In operation, the MEC 200 typically makes obstacle determinations. However, the RSU 101 processes some samples (at a very low frequency such as 1 image/second or 1 lidar point cloud/second) to determine the problematic regions. Then, the RSU 101 may mark those as problematic regions. In this case, the RSU 101 provides the region information to the MEC 200 so that the MEC 200 may choose to ignore those regions. In effect, calibration module of the RSU 101 may execute an automatic calibration, or rely on a pre-determined calibration table, according to the results of the sensor data processing. The automatic or pre-determined calibration variables are then used to, for example to, automatically determine or look-up a frequency threshold for filtering the noise caused by the harsh conditions.

Figure 8A:
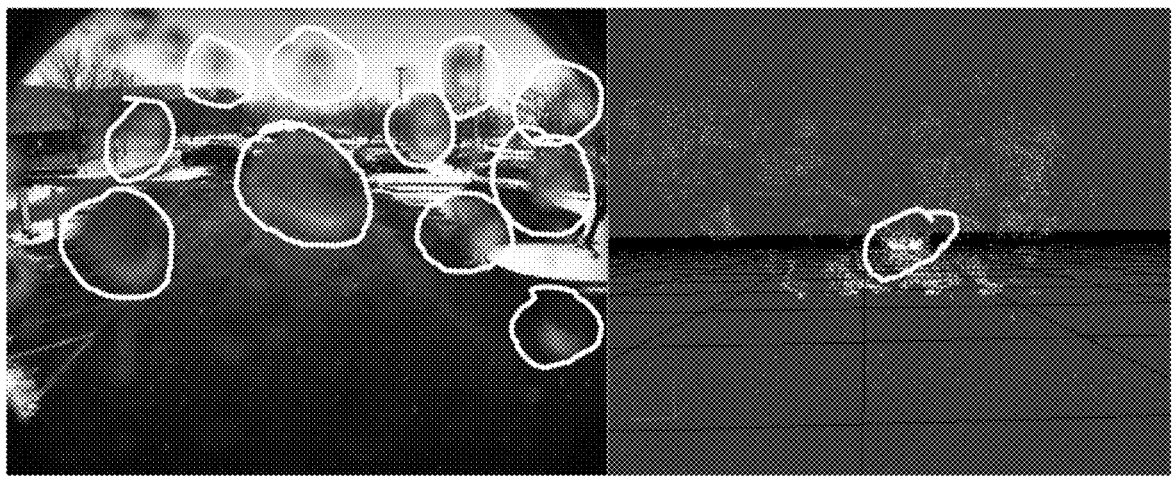
FIGS. 8A-8B are illustrations showing conditions where sensors are partially or fully deactivated.
Figure 8B:
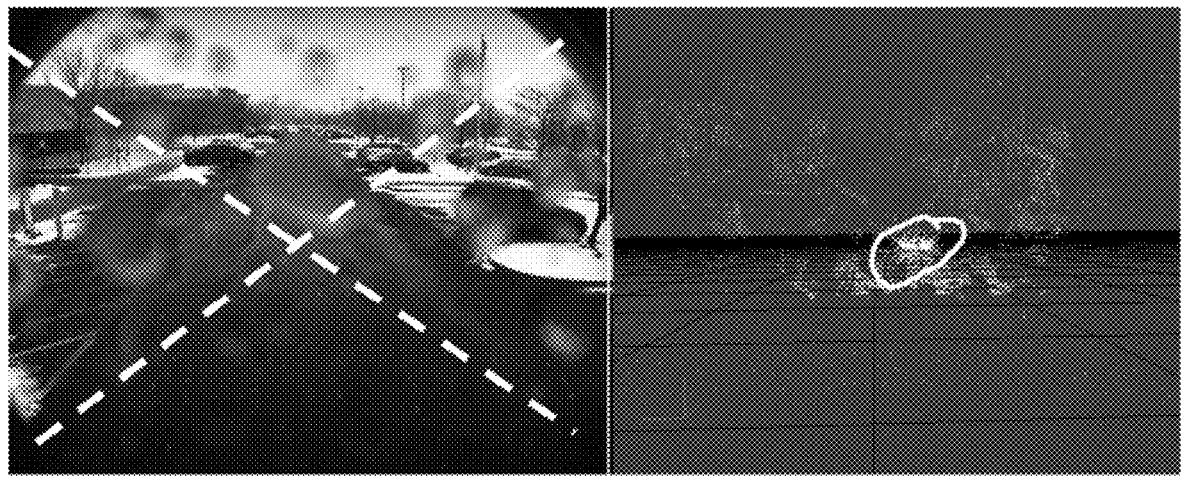

After obtaining these results, the detection response module 260 of the MEC 200 may use the diagnosis result to mandate a sub-system be deactivated, or may ignore the data from the failed portions of the system, while maintaining the best functional performance of the overall system in light of the weather conditions. As illustrated in FIG. 8A, the LiDAR is partly affected but most of the data is useful. However, the large impact on the image sensor results in a condition where the MEC 200 ignores the camera image data as shown in FIG. 8B. The image sensor may also be deactivated.

FIG. 9 is a flowchart showing a method for responding to the harsh conditions based on determinations made by the sensor processing and calibration module 180. The RSU 101 receives sensor data and processes the data at a lower frequency to obtain an initial result (step S1). For example, the RSU 101 samples the sensor images and LiDAR point cloud at a lower frequency than the normal real processing rate used for actual detection purposes. The frequency can be as low as 1 frame per second. Based on this initial result, the RSU 101 determines whether there is any harsh weather condition (rain, snow, ice, icicles) that can possibly affect the quality of data. The possible methods for determining the harsh weather conditions include the use of the pre-trained machine learning model based on a large dataset, or by a comparison to some predetermined sensor thresholds. Next, the RSU 101 determines if the sensor data is still useful after possible post-processing or self-calibration (step S2). If the weather condition is so harsh and no counteraction or self-calibration is possible, then the RSU 101 reports the status to the MEC 200 (step S3).

Post-processing is a general technique such as removing those iced and icicles regions while maintaining data in regions without any blocking by the ice or icicles. For example, water condensed in front of the camera lenses or the icicles formed in front of the camera, some approaches include: (1) using advanced image processing algorithm which identifies the regions of an image that shows blurred features (blurred feature detection), and (2) inferencing machine learning models trained with previously obtained annotated data collected under various water condensation conditions and determining those affected regions in real-time.

Self-calibration is a procedure where the sensor software adjusts the calibration variables of the sensors (such as focal length of camera or the intensity of the Lidar laser intensity) or the processing parameters (such as the filtering parameters for the images or the Lidar point cloud filtering variables) depending on the condition in real-time. If the RSU 101 determines that the sampled data can be corrected with post-processing or self-calibration, then proceeds to step S4.

Given that the data is useful (the downward path from S2), step S4 determines whether to use self-calibration or post-processing. The self-calibration and the post-processing treat different kinds of harsh conditions. Self-calibration is generally used to treat harsh conditions that occur in the overall environment, such as foggy, snowy, or raining conditions in which the calibration variables (such as camera focus, or intensity of the Lidar beams), can improve the overall sensor data.

To the contrary, post-processing is generally used to treat a harsh conditions that occur in a specific region. An example is the icicles or ice blocking multiple but small regions of the image or Lidar point cloud reception as shown in FIG. 7 (*b*). In that case, the self-calibration will not work, but post-processing can eliminate regions of poor data to cull out those portions providing useful data.

Depending on the application of the system, and the regions affected by the harsh condition, the sensor data may or may not maintain some useful information. For example, if the water condenses and forms a thin sheet throughout the overall camera lenses, the sensor data is not useful. If condensation occurs in some areas, i.e., small droplets or icicles formed in a limited area in front of the sensor (as shown in FIG. 6C) the sensor data can still provide useful information in certain areas.

In step 4, the RSU 101 determines if self-calibration is possible either by a predetermined calibration set or a real-time calibration. If it is possible to do a self-calibration, the process proceeds to step S6 and performs self-calibration. If it is not possible to do a self-calibration the process proceeds to step S5 and executes the general post-processing for the real time data and sends the result to the MEC 200.

The self-calibration of step S6 includes two possible approaches. One approach is to determine the weather conditions, for example, rain/snow/ice, etc. and then load those pre-determined calibration set of variables that have been previously investigated through the similar conditions. The second approach is to determine those calibration set of variables in real-time based the on the currently sensed data.

After executing the self-calibration, the real-time data is processed and sent to the MEC 200 for further processing (step S7).

Post-processing, as set forth in FIG. 9, is a general technique such as removing those iced and icicled regions and only use those regions without any blocking by the ice or icicles. The first step is to correctly identify those iced and icicled regions (or other blurred or blocked areas). This is accomplished by first identifying those iced and icicled regions by analyzing some data collected from the sensor in real-time. In general, the regions with iced and icicles usually contains very similar data values (similar to the blurring effect caused by a low-pass filter). The regions without those ices and icicles contains sharply changing values (no blurring effect). After being determined, those blurred regions are corrected by applying counteract post-processing to removing those problematic regions, or annotate those regions in the data.

One possibility is to transmit the other portions of the sensor data to the second processing apparatus (MEC). For example, for those iced regions in an image, RGB values can be generated for those regions (such as [0, 0, 0]) so that, in effect, the MEC 200 would not take into account the actual invalid raw sensor data. As another example of post-processing for the Lidar point cloud, portions of the LiDAR point cloud data corresponding to the problematic regions are removed.

Another possibility is to send all the sensor data with annotation information identifying the problematic regions to the MEC 200. Then, the MEC 200 can perform data processing to remove or ignore those problematic regions.

The self-calibration can be based on advanced signal processing in real-time. For example, under foggy conditions, the image or LiDAR point cloud may contain more noise when the data is analyzed in the frequency domain (such as applying the Fourier transform on the images and checking the noise level). In these cases, it may be possible to change the hardware setting such as the camera focus or the intensity of the Lidar point cloud transmitter and then determine if the noise level is reduced. Alternatively, the image or Lidar point cloud data can be improved directly by an image or Lidar signal processing algorithm implemented as part of the software in the sensor processing and calibration module 180 of the RSU 101. When the noise level is reduced to acceptable levels, the data can be sent to the MEC 200 for real-time data processing.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A first processing apparatus comprising:
at least one hardware processor configured to implement;
a communication module that receives sensor data collected by multiple sensors disposed to capture sensor data in a specified region to detect obstacles;
a health status detection module that determines a health status of the first processing apparatus and the sensors based on information from the sensors and a communication status between the communication module and the sensors,
where the first processing apparatus communicates, to a second processing apparatus, the determined health status and processed sensor data based on the detected health status of the sensors.

2. The first processing apparatus according to claim 1, wherein health status detection module determines the communication status with each sensor based on a message transmitted from the first processing apparatus to a corresponding sensor and by measuring the latency time between the transmitted message and a return message received from the corresponding sensor.

3. The first processing apparatus according to claim 2, wherein the latency time is measured by including a first timestamp indicating when the message was transmitted to the corresponding sensor, and measuring the difference in time between the first timestamp and a second timestamp indicating when the message was received back from the corresponding sensor.

4. The first processing apparatus according to claim 2, wherein the latency time is measured by including a first timestamp indicating when the message was transmitted to the corresponding sensor, and measuring the difference in time between the first timestamp and a second timestamp indicating when the message is retransmitted by the corresponding sensor.

5. The first processing apparatus according to claim 1, wherein the at least one processor comprises a first central processing portion including a first main processing core and a first checker processing core, and a second central processing portion including a second main processing core and a second checker core, wherein data is processed on both the first main processing core and the first checker processing core and processing from each of the first main processing core and the first checker core are compared by the health status detection module, and in response to the health status detection module determining that the comparison results are not consistent, the first main processing core is disabled and the data processing is changed to be processed by the second main processing core and the second checker core.

6. The first processing apparatus according to claim 5, wherein when the data processing is initially implemented on the second main processing core and the second checker core, the health status detection module data communicates the processing change to the second processing apparatus.

7. The first processing apparatus according to claim 1 further comprising:
a sensor processing and calibration module that processes sensor data and performs sensor calibration based on the processed sensor data,
wherein the sensor processing and calibration module processes sensor data at a frequency lower than a normal frequency of operation and determines whether the low frequency processed data indicates a harsh condition representing external impacts on the sensors prevent useful data, and
in response to determining the harsh condition exists, the sensor processing and calibration module requests that the sensor be self-calibrated to adjust sensor characteristics at the sensor.

8. The first processing apparatus according to claim 7, wherein in response to the sensor processing and calibration module determining that the low frequency data provides useful data, the sensor processing and calibration module determines whether sensor data obtained from the sensors exhibits anomalies representing harsh conditions exist for each sensor, and
in response to anomalies being detected in the sensor data from a corresponding sensor, the sensor processing and calibration module instructs the sensor processing and calibration module to perform post-processing on the sensor data received from the corresponding sensor.

9. The first processing apparatus according to claim 8, wherein the post-processing detects portions of the sensor data from a corresponding sensors data that correspond to anomalies to identify anomalous portions, and transmits the other portions of the sensor data to the second processing apparatus, or transmits the sensor data with annotated portions identifying the portions of the sensor data that correspond to the anomalies to the second processing apparatus.

10. A processing system for processing sensor data comprising:
a first processing apparatus having at least one processor configured to implement:
a first communication module that receives sensor data collected by multiple sensors disposed to capture sensor data in a specified region to detect obstacles;
a first health status detection module that determines a health status of the first processing apparatus and the sensors based on information from the sensors and a communication status between the communication module and the sensors;
a sensor processing and calibration module that processes sensor data and performs sensor calibration based on the processed sensor data based on the determined health status; and a second processing apparatus having at least one processor configured to implement:
a second communication module that receives the health status and the sensor data processed by the sensor processing and calibration module;
a second health status detection module that determines a health status of the second processing apparatus based the health status of the first information processing apparatus and a communication status between the second communication module and the first communication module; and
a detection response module that processes the sensor data processed by the sensor processing and calibration module based on the health status of the second processing apparatus.

11. The processing system for processing sensor data according to claim 10, wherein first health status detection module determines the communication status with each sensor based on a message transmitted from the first processing apparatus to a corresponding sensor and measuring the latency time between the transmitted message and a return message received from the corresponding sensor, and
the second health status detection module determines the communication status with the first processing apparatus based on a message transmitted from the second processing apparatus to the first processing apparatus and by measuring the latency time between the transmitted message and a return message received from the first processing apparatus.

12. The processing system for processing sensor data according to claim 11, wherein the latency time is measured by including a first timestamp indicating when the message was transmitted to the corresponding sensor, and measuring the difference in time between the first timestamp and a second timestamp indicating when the message was received back from the corresponding sensor.

13. The processing system for processing sensor data according to claim 11, wherein the latency time is measured by including a first timestamp indicating when the message was transmitted to the first processing apparatus, and measuring the difference in time between the first timestamp and a second timestamp indicating when the message is retransmitted by the first processing apparatus.

14. The processing system for processing sensor data according to claim 10, wherein the at least one processor of the second processing apparatus comprises a first central processing portion including a first main processing core and a first checker processing core, and a second central processing portion including a second main processing core and a second checker core,
wherein data is processed on both the first main processing core and the first checker processing core and processing from each of the first main processing core and the first checker core are compared by the second health status detection module, and
in response to the second health status detection module determining that the comparison results are not consistent, the first main processing core is disabled and the data processing is changed to be processed the second main processing core and the second checker core.

15. The processing system according to claim 10, the first processing apparatus further comprising:
a sensor processing and calibration module that processes sensor data and performs sensor calibration based on the processed sensor data,
wherein the sensor processing and calibration module processes sensor data at a frequency lower than a normal frequency of operation and determines whether the low frequency processed data indicates a harsh condition representing external impacts on the sensors prevent useful data, and in response to determining the harsh condition exists, the sensor processing and calibration module requests that the sensor be self-calibrated to adjust sensor characteristics at the sensor.

16. The processing system according to claim 15, wherein in response to the sensor processing and calibration module determining that the low frequency data provides useful data, the sensor processing and calibration module determines whether sensor data obtained from the sensors exhibits anomalies representing harsh conditions exist for each sensor, and in response to anomalies being detected in the sensor data from a corresponding sensor, the sensor processing and calibration module instructs the sensor processing and calibration module to perform post-processing on the sensor data received from the corresponding sensor.

17. The processing system according to claim 16, wherein the post-processing detects portions of the sensor data from a corresponding sensors data that corresponds to anomalies to identify anomalous portions, and transmits the other portions of the sensor data to the second processing apparatus, or transmits the sensor data with annotated portions identifying the portions of the sensor data that correspond to the anomalies to the second processing apparatus.

* * * * *